United States Patent
Lei et al.

(10) Patent No.: US 9,794,831 B2
(45) Date of Patent: Oct. 17, 2017

(54) METHOD FOR SHORTENING SIGNALING DELAY OF ISC SESSION TRANSFER, NETWORK ELEMENT AND SYSTEM

(75) Inventors: Zhengxiong Lei, Shanghai (CN); Xueqiang Yan, Shanghai (CN); Zhiyuan Hu, Shanghai (CN); Yonggen Wan, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 1049 days.

(21) Appl. No.: 13/505,049

(22) PCT Filed: Oct. 30, 2009

(86) PCT No.: PCT/CN2009/074721
§ 371 (c)(1),
(2), (4) Date: Jul. 10, 2012

(87) PCT Pub. No.: WO2011/050530
PCT Pub. Date: May 5, 2011

(65) Prior Publication Data
US 2012/0275432 A1    Nov. 1, 2012

(51) Int. Cl.
*H04W 36/00* (2009.01)
*H04L 29/06* (2006.01)

(52) U.S. Cl.
CPC ..... *H04W 36/0022* (2013.01); *H04L 65/1016* (2013.01); *H04L 65/1083* (2013.01); *H04L 65/80* (2013.01)

(58) Field of Classification Search
CPC .................................................. H04W 36/0022
See application file for complete search history.

(56) References Cited

U.S. PATENT DOCUMENTS 7,532,647 B2 *  5/2009  Eichler et al. ................ 370/524
8,169,968 B1 *  5/2012  Stegall et al. ................. 370/331
(Continued)

FOREIGN PATENT DOCUMENTS

CN      101193449 A    6/2008
JP      2006-526964    11/2006
(Continued)

OTHER PUBLICATIONS

"Digital cellular telecommunications system (Phase 2+); Universal Mobile Telecommunications System (UMTS); LTE; IP Multimedia Subsystem (IMS) Service Continuity; Stage 2 (3GPP TS 23.237 version 8.5.0 Release 8)," ETSI TS 123 237 V.8.5.0, pp. 1-41, Oct. 2009).

(Continued)

Primary Examiner — Gregory Sefcheck
(74) Attorney, Agent, or Firm — Fay Sharpe, LLP

(57) ABSTRACT

The present invention provides a method for shortening signaling delay of ISC session transfer procedure, a network element for controlling ISC session transfer, a network element for anchoring a media path in ISC session transfer and a communication system including at least two terminals and the above two network elements. In the present invention, the SCC AS decides if a media path needs to be anchored in a media anchor point MRF, and if yes, then instructs a MRF to assign respective media endpoints for a local UE and a remote UE and connect the two media endpoints together, so as to divide the session between the local UE and the remote UE into two independent subsessions: a session between the local UE and the MRF, and a session between the remote UE and the MRF. For these two sub-sessions, the SIP signaling is terminated and sent out in the SCC AS. Thus, when a local UE or a remote UE (Continued)

triggers handover, only one sub-session needs to be updated/influenced.

15 Claims, 7 Drawing Sheets

(56) References Cited

U.S. PATENT DOCUMENTS

| | | | |
|---|---|---|---|
| 8,179,861 B2* | 5/2012 | Wohlert et al. | 370/331 |
| 8,208,925 B2* | 6/2012 | Attar et al. | 455/436 |
| 8,340,627 B2* | 12/2012 | Edge | 455/404.1 |
| 8,437,368 B2 | 5/2013 | Krishnamurthi et al. | |
| 8,565,772 B2* | 10/2013 | Bae et al. | 455/439 |
| 8,718,043 B2* | 5/2014 | Chin et al. | 370/352 |
| 8,781,509 B2* | 7/2014 | Fang et al. | 455/466 |
| 2009/0225725 A1 | 9/2009 | Zhu | |
| 2009/0245180 A1 | 10/2009 | Wu | |
| 2012/0057569 A1 | 3/2012 | Xie et al. | |

FOREIGN PATENT DOCUMENTS

| | | |
|---|---|---|
| JP | 2010-510733 | 4/2010 |
| JP | 2012-527793 | 11/2012 |
| WO | WO 2006/138736 | 12/2006 |
| WO | WO2009/088197 A2 | 7/2009 |

OTHER PUBLICATIONS

International Search Report for PCT/CN2009/074721 dated Aug. 5, 2010.
Japanese Search Report dated Aug. 27, 2013.
"3$^{rd}$ Generation Partnership Project: Technical Sepcification Group Services and Architecture; IP Multimedia Subsystem (IMS) Service Continuity; Stage 2 (Release 9)", 3GPP TS 23.237 v9.2.0 (Sep. 2009), pp. 1-88.
3$^{rd}$ Generation Partnership Project: Technical Sepcification Group Services and Systems Aspects; Single Radio Voice Call Continuity (SRVCC) enhancements; Stage 2 (Release 10), 3GPP TS 23.856, v10.0.0 (Sep. 2010), pp. 1-80.

* cited by examiner

METHOD FOR SHORTENING SIGNALING DELAY OF ISC SESSION TRANSFER, NETWORK ELEMENT AND SYSTEM

FIELD OF THE INVENTION

The present invention relates to the field of communications, and more particularly to techniques of shortening signaling delay of IMS service continuity (ISC) session transfer procedure.

BACKGROUND OF THE INVENTION

The ISC is a technique for defining how to maintain service continuity by using session transfer mechanism in case that a user device UE is moving (since the movement of the UE can not be hided to the IMS session layer, the service continuity can not be maintained). More details about the ISC techniques may refer to 3GPP TS 23.237.

There is an important signaling delay in the ISC session transfer procedure. As known, the ISO session transfer procedure comprises a sub-procedure of remote leg update, which constitutes a main portion of the delay. In an extreme situation, such as roaming, the sub-procedure of remote leg update leads to a great signaling delay, since a lot of nodes are needed in the SIP signaling path to process SIP messages, as shown in FIG. 1. It should be noted that, although as shown in FIG. 1, the remote UE is an IMS terminal, the situation of delay is similar while the remote UE is a PLMN/PST terminal. As shown in FIG. 1, 9 nodes are needed in the IMS signaling path to processing an UPDATE or Re-INVITE message. FIG. 2 shows the end to end session between the local UE and the remote UE before performing the existing ISO procedure (without the optimizing mechanism of the present invention). When the ISO session transfer procedure occurs, a sub-procedure of remote leg update may cause a long delay, as described above.

If the signaling delay is too long, a call will be interrupted while a UE which can perform a dual radio handover between an IP continuity access network (IP-CAN) and a circuit domain network is moving rapidly, and the interruption duration is very long when the UE performs a SRVCC handover from the IP-CAN to the circuit domain network and the service experience degrades, and the call will also be interrupted in the worst situation. Both of the two problems will cause the users' service experience to degrade.

SUMMARY OF THE INVENTION

The object of the present invention is to solve the above problems in the prior art.

According to an aspect of the present invention, a method for shortening signaling delay in the IMS service continuity (ISC) session transfer procedure is proposed, the method comprising: a first network element receiving a session setup request message and forwarding said session setup request message to a second network element according to initial filter criteria iFC; said second network element deciding if a condition for anchoring media path in a media anchor point is met, and if yes, then indicating said media anchor point to assign respective media endpoints for a local terminal and a remote terminal; said media anchor point assigning respective media endpoints for said local terminal and said remote terminal, connecting said media endpoints and sending a first response message with session description protocol information of said media endpoints to said second network element; said second network element terminating a sub-session with said local terminal according to said session description protocol information and initiating creation of sub-session with said remote terminal; after said remote terminal having acknowledged, said second network element sending a second response message with session description protocol information of media endpoint of said local terminal to said local terminal via said first network element. When said ISO session transfer is being performed, said method also comprises: said second network element sending a first message with session description protocol information of a target transfer-in access leg to said media anchor point upon reception of a handover request message; said media anchor point replacing a source transfer-out access leg by said target transfer-in access leg and acknowledging said second network element.

Advantageously, the above method according to the present invention also comprises: after said second network element having sent said second response message to said local terminal, said local terminal acknowledging said second network element in an access leg sub-session, and then said second network element acknowledging said remote terminal in a remote leg sub-session.

According to another aspect of the present invention, a network element for controlling IMS service continuity session transfer is proposed, the network element comprising: deciding means for deciding if a condition for anchoring media path in a media anchor point is met upon reception of a session setup request message, and if yes, then indicating said media anchor point to assign respective media endpoints for a local terminal and a remote terminal; sub-session setup means for terminating a sub-session with said local terminal according to a session description protocol information upon reception of a first response message with said session description protocol information of said media endpoints from said media anchor point, and initiating creation of sub-session with said remote terminal; first message sending means for sending a second response message with session description protocol information of media endpoint of said local terminal to said local terminal, after the remote terminal having acknowledged; and second message sending means for sending a first message with session description protocol information of a target transfer-in access leg to said media anchor point upon reception of a handover request message.

According to yet another aspect, a network element for anchoring media path in IMS service continuity session transfer is proposed, the network element comprising: media endpoint Configuring means for assigning respective media endpoints for a local terminal and a remote terminal upon reception an instruction from another network element and connecting said media endpoints together; message sending means for sending a response message with session description protocol information of said media endpoints to said another network element; and access leg updating means for replacing a source transfer-out access leg by a target transfer-in access leg.

According to yet another aspect, a communication system is proposed, comprising: at least two terminals; network element for controlling IMS service continuity session transfer according to the present invention; and network element for anchoring media path in IMS service continuity session transfer according to the present invention.

BRIEF DESCRIPTION OF THE DRAWINGS

These and many other features and advantages of the present invention will become apparent from the following description of the embodiments of the present invention with reference to the drawings, wherein.

DETAILED DESCRIPTION OF THE INVENTION

Figure 1:
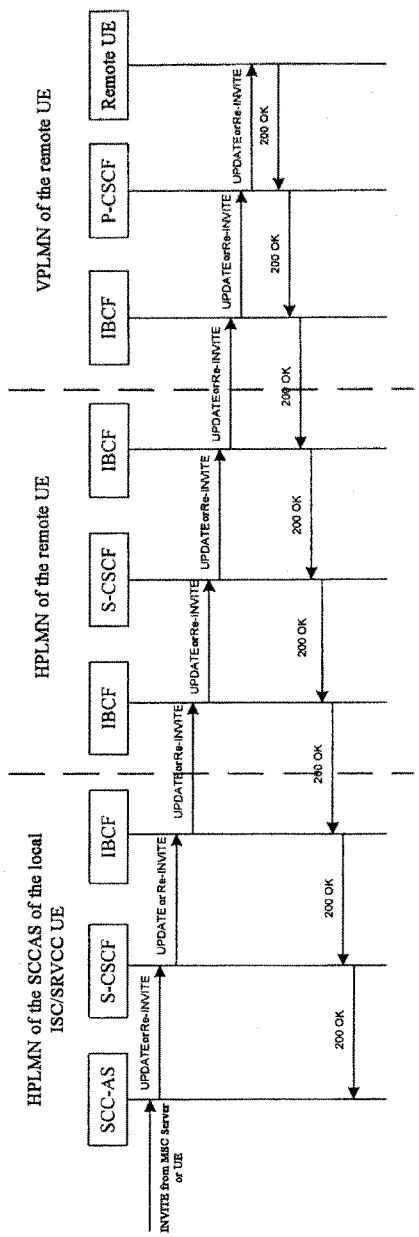
FIG. 1 shows remote leg update in an existing ISC session transfer procedure in case of roaming.
Figure 2:
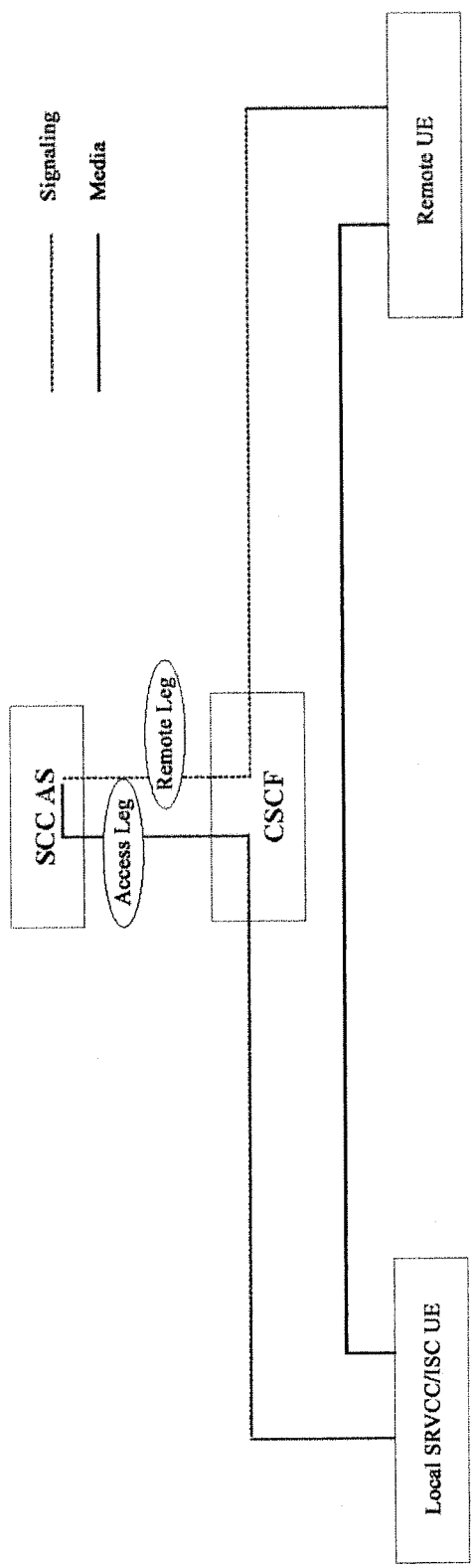
FIG. 2 schematically shows the end to end session of the original ISC procedure.
Figure 3:
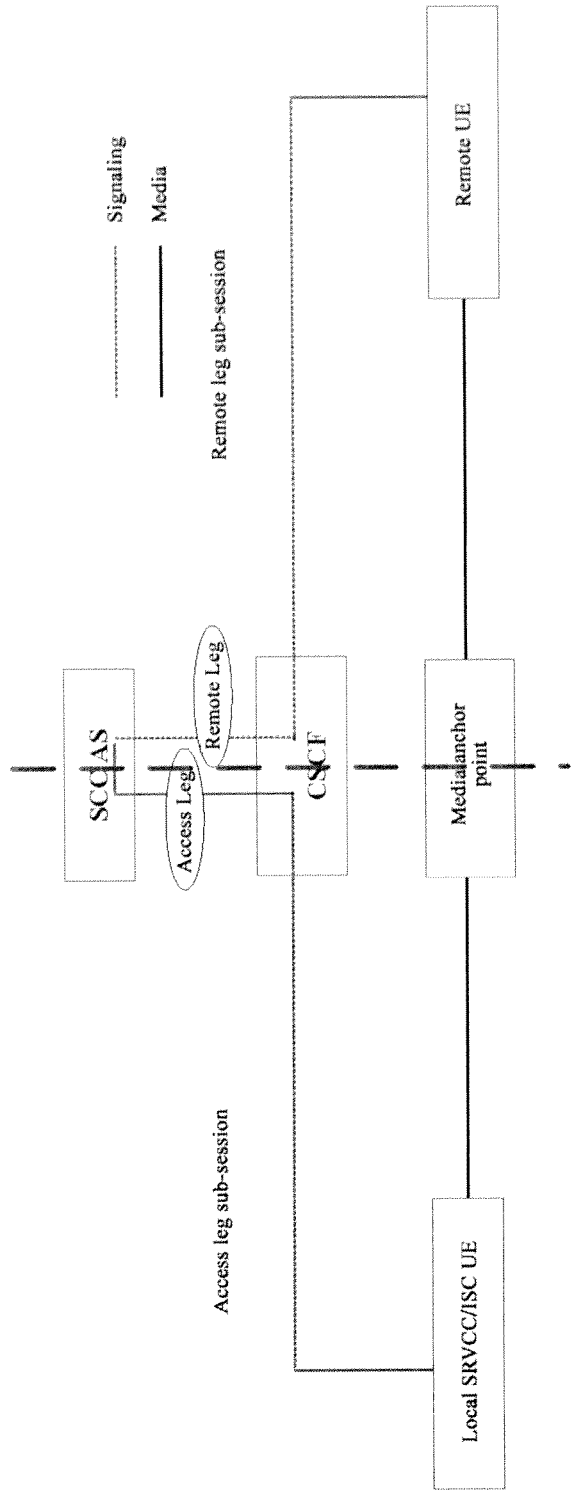
FIG. 3 schematically shows two independent sub-sessions according to the present invention.

The basic idea of the present invention is to divide a session between a local UE and a remote UE into two independent sub-session by introducing a media anchor point. More particularly, when a session is being setup, if a network entity (such as a Serving-Call Session Control Function entity (S-CSCF), a Service Continuity Control Application Server (SCC AS), or an Interconnection Broader Control Function entity (IBCF)) finds that a longer signaling delay may occur in a remote leg update sub-procedure during a subsequent transfer procedure between an IP-CAN and a CS domain (in which an ISC procedure is used), then it will anchor a media path into the media anchor point besides anchoring a signaling path in the SCC AS. It should be noted that, in the present invention, a media resource function entity MRF is used as a media anchor point. However, it should be clear that this media anchor point may for example be a MRF, a Media GateWay (MGW) or an Interconnection Border Gateway Function entity (IBGF). In this way, the end to end session between the local UE and the remote UE is divided into the following two independent sub-sessions: a session between the local UE and the media anchor point, and a session between the remote UE and the media anchor point. For these two sub-sessions, the SIP signaling is terminated and sent out in an appropriate network entity (such as a SCC AS or an IBCF), said network entity being used as a Back-to-Back User Agent (B2BUA) and controlling the media anchor point to be anchored in the media path. FIG. 3 schematically shows these two independent sub-sessions. Thus, when the local UE or the remote UE triggers handover, only one sub-session needs to be updated/influenced, either the sub-session between the local UE and the media anchor point or the sub-session between the remote UE and the media anchor point. In other words, the signaling delay of the remote leg update sub-procedure may be shortened by means of this mechanism. When the SCC AS terminates the SIP signaling of the two sub-sessions, the delay of the remote leg update sub-procedure may shortened to zero.

It should be noted that, in the present invention, it is the SCC AS that detects if a long signaling delay of the remote leg update sub-procedure may occur during a subsequent handover process between the IP-CAN and the CS domain. That is to say, it is the SCC AS that decides if certain condition which may cause a long signaling delay is met. However, it should be clear, the present invention is not limited to use the SCC AS, but can also use other entities to implement the above functionality, such as a S-CSCF or an IBCF. Condition for deciding comprises for example if the local UE supports SRVCC/ISC natures and if the local UE camps in an access network with high SRVCC handover probability (for example deploying a LTE and IMS network with a smaller LTE coverage, and thus the HPLMN defining this network with high SRVCC handover probability). When both of the above two conditions are met, the MRF will be introduced into the session and anchor the media paths of the local UE and the remote UE. If the above two conditions are not met at the same time, the procedure will continue according to standard IMS session setup procedure and ISC handover procedure.

It should be noted that, although the present invention only describes such a case as the local UE initiating a call, it should be understood that the present invention is applicable also to the case that the local UE is a callee, in which case the remote UE can be considered as "a local UE".

For deciding a high SRVCC handover probability of an access network, the SCC AS may pre-configure a list of Proxy call session control function entity (P-CSCF) corresponding to the access network with high SRVCC handover probability. In this way, the SCC AS may analyze the header of a SIP INVITE message upon session setup so as to obtain a corresponding P-CSCF of the access network of the local UE, and then search for that P-CSCF in said list. If there are only two "via" header fields in the INVITE message, i.e. the local UE being the caller, then the domain name or address of the P-CSCF can be obtained by querying the top "via"; if the "via" header fields are more than two, i.e. the local UE being the callee, then the SCC AS may be directly informed of the P-CSCF to be compared in said list, since the S-CSCF has known the P-CSCF of the local UE.

It should be clear that, the threshold of a high SRVCC handover probability may be set by an operator as needed, and an operator can also predefine a network with high SRVCC handover probability.

Figure 4:
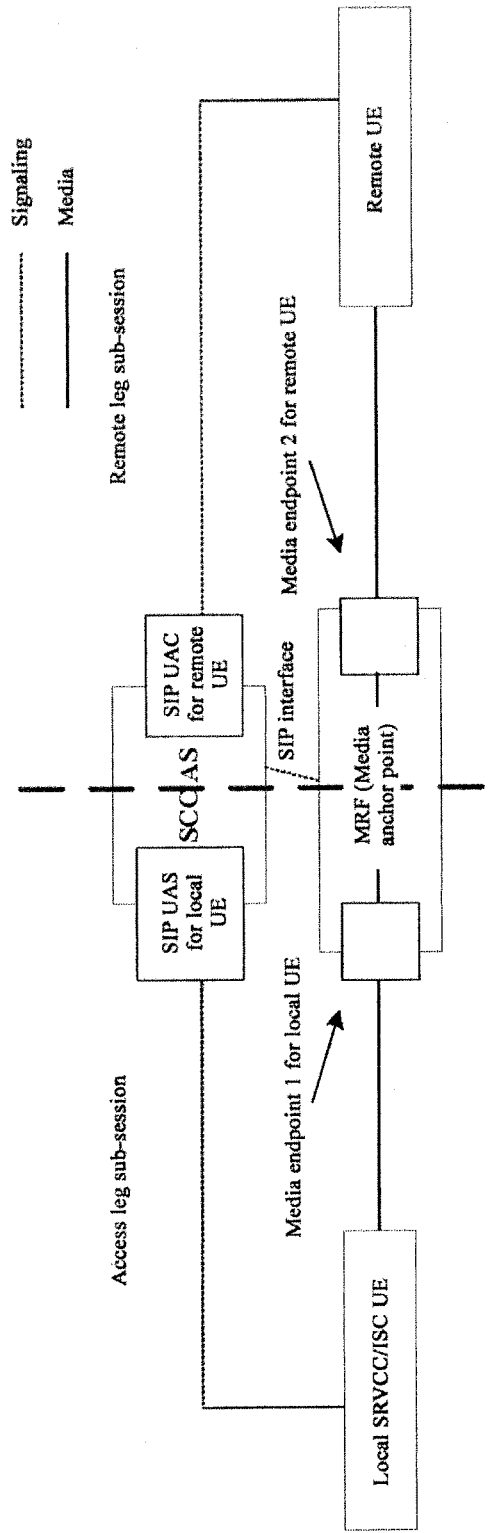
FIG. 4 schematically shows a MRF anchoring session media and a SCC AS anchoring session signaling.

FIG. 4 schematically shows the SCC AS controlling the MRF to be anchored in the media path upon detection of a possible long signaling delay during the subsequent handover. As shown in FIG. 4, as a B2BUA, the SCC AS comprises a SIP User Agent Server (UAS) for local UEs and a SIP User Agent Client (UAC) for remote UEs, which are used for anchoring session signaling. The SIP UAS terminates a local UE access leg (i.e. terminating a SIP message from a local UE) and instructs the MRF to create a media endpoint 1 for the local UE. Then, the SIP UAS exchanges the media endpoint 1 and the Session Description Protocol (SDP) information of the local UE with the local UE. In this way, the SIP UAS in the SCC AS, the local UE and the media endpoint 1 in the MRF form an access leg sub-session. On another hand, the SIP UAC in the SCC AS initiates creation of a remote leg (i.e. sending out a SIP message to the remote UE) and instructs the MRF to create a media endpoint 2 for the remote UE. Afterwards, the SIP UAC exchanges the media endpoints 2 and the SDP information of the remote UE with the remote UE. In this way, the SIP UAC in the SCC AS, the remote UE and the media endpoint 2 in the MRF form a remote leg sub-session. Then, the MRF connects the media endpoints 1 and 2 together. Thus, by means of the media anchor point MRF, the end to end session between the local UE and the remote UE is divided into two independent sub-sessions without interrupting the media connection between the local UE and the remote UE: an access leg and a remote leg, and each of the sub-session may be updated without influencing another sub-session.

In this way, when the local UE triggers an ISC handover, only the access leg sub-session needs to be updated and it is not necessary to perform the remote leg update sub-procedure, thereby the IMS signaling delay due to the remote leg update sub-procedure being shortened to zero. It should be understood that, the present invention is applicable also to the case that the remote UE triggers an ISC handover, in which case the remote UE can be considered as "the local UE".

Figure 5:
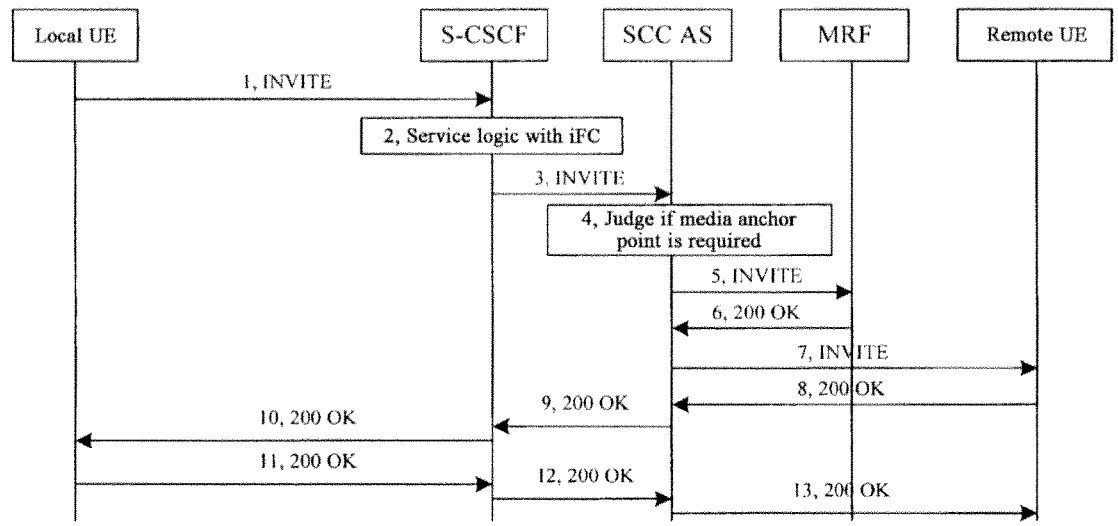
FIG. 5 is a signaling flowchart of session setup process according to the present invention.

FIG. 5 shows the signaling flowchart of session setup procedure according to the present invention. As shown in FIG. 5, only the typical session of a PS media flow is used herein to explain how to setup a session by using the mechanism of the present invention. Since the remote leg update sub-procedure is independent of manners of session setup, the mechanism of the present invention may also be used in other situations similarly.

In step 1, the local UE sends an INVITE message to the S-CSCF in order to initiate a session. It should be clear that this SIP message passes through the P-CSCF and possibly the IBCF, which are not shown in FIG. 5 for simplicity because that they are not key point for describing the mechanism of the present invention. Certain nodes will also be omitted in the following description for the same reason.

Then, in steps 2 and 3, a service logic with iFC causes this request to be forwarded to the SCC AS for anchoring session to implement a session handover.

Next, in step 4, the SCC AS checks for certain condition to decide if the media path should be anchored into the media anchor point MRF. If the condition is met, then in step 5, the SCC AS sends the INVITE message to the MRF and instructs it to assign a media endpoint 1 for the local UE and a media endpoint 2 for the remote UE. The MRF then connects the endpoints 1 and 2 together. It should be noted that, other optional solutions for setting up media endpoints may also be used, for example the SCC AS sending two INVITE messages, one for instructing the MRF to setup the media endpoint 1, another for setup the media endpoint 2.

Next, in step 6, the MRF responds to the SCC AS with a 200 OK message having the SDP information of the media endpoints 1 and 2. Then, in step 7, the SCC AS terminates an access leg sub-session, and initiates creation of a remote leg sub-session towards the remote UE by means of the SDP information of the media endpoint 2. The SIP messages from the SCC AS to the remote UE will pass through the P-CSCF, the S-CSCF and possibly the IBCF.

Next, in step 8, the remote UE responds to the SCC AS with a 200 OK message. In step 9, the SCC AS sends to the S-CSCF a 200 OK message having the SDP information of the media endpoint 1 of the MRF. In step 10, the S-CSCF forwards this 200 OK message to the local UE. In steps 11 and 12, the local UE acknowledges the 200 OK in the access leg sub-session.

Finally, the SCC AS acknowledges the 200 OK in the remote leg sub-session.

Thereby, after step 12, the end to end session between the local UE and the remote UE is divided into two independent sub-sessions. When the local UE or remote UE triggers a handover, only one sub-session needs to be updated/influenced.

Figure 6:
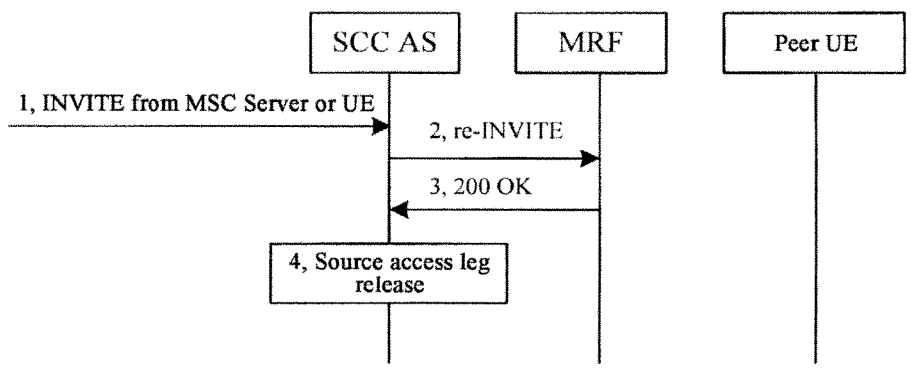
FIG. 6 is a signaling flowchart of session transfer process according to the present invention.

FIG. 6 shows the signaling flowchart of the session transfer procedure. In step 1, when a session transfer procedure needs to be performed, the SCC AS receives an INVITE message from the MSC server or the local UE. Then, in step 2, the SCC AS sends to the MRF a re-INVITE message having the SDP information of the target transfer-in access leg (the access leg into which the UE will enter during the transfer procedure). In step 3, the MRF replaces a source transfer-out access leg (the access leg that the UE will leave during the transfer procedure) by the target transfer-in access leg, and then sends a 200 OK to the SCC AS. After this step, a media flow form the peer UE (remote UE or local UE) will be transferred to the transfer-in access leg. Finally, in step 4, the source transfer-out access is released.

In this way, by using the mechanism of the present invention, the signaling delay of the ISO session transfer procedure is shortened. In particular, when the SCC AS terminates the SIP signaling of the two sub-sessions, the delay of the remote update sub-procedure may be shortened to zero. Furthermore, the implementation of mechanism of the present invention does not need to introduce a new network function entity and only needs to slightly modify the existing function entities, which thus provides an advantage of simply implementation.

Figure 7:
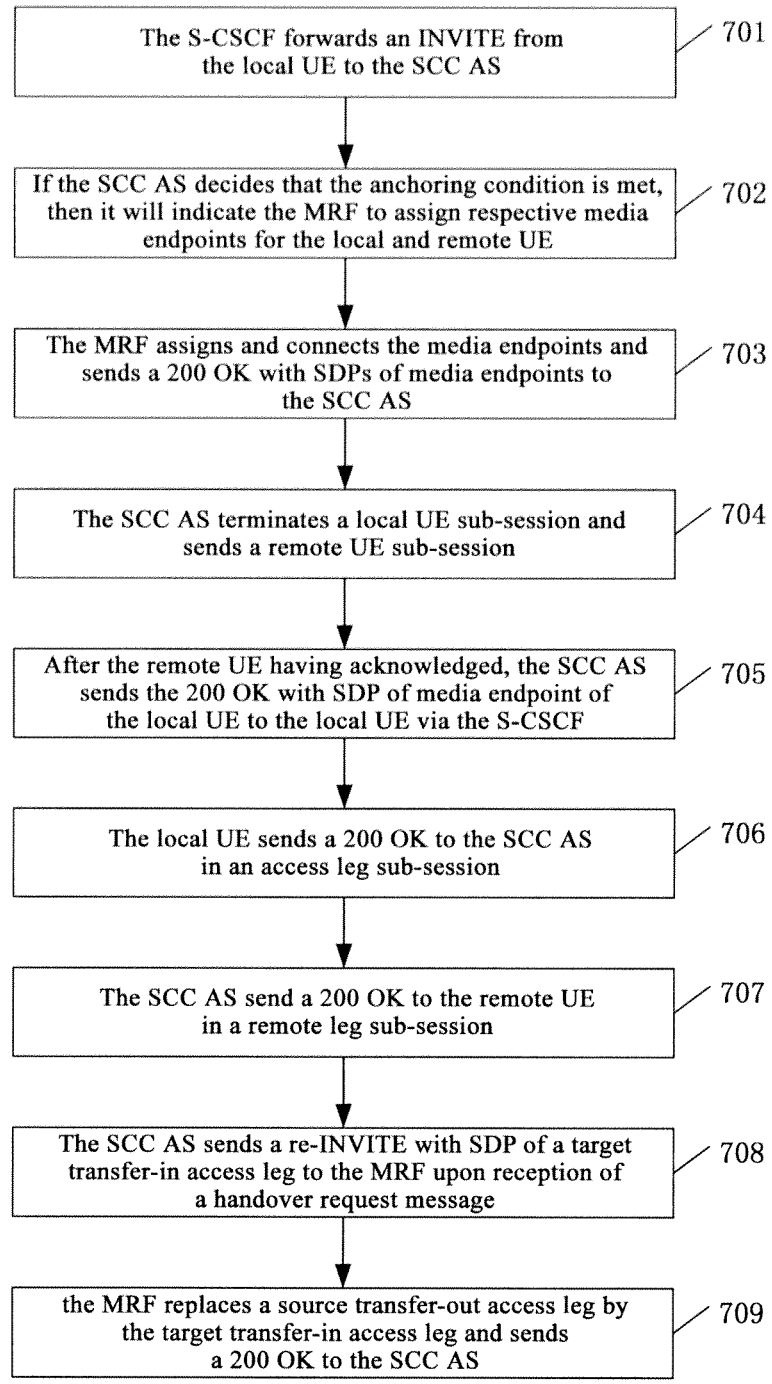
FIG. 7 is a flowchart of a method for shortening signaling delay in ISC session transfer procedure according to an embodiment of the present invention.

FIG. 7 shows a flowchart of method for shortening signaling delay of the ISC session transfer procedure according to an embodiment of the present invention. The method for shortening signaling delay will be described below with reference to FIG. 7.

In step 701, a first network element receives a session setup request message and forwards said session setup request message to a second network element according to initial filtering criteria iFC. Herein, said first network element is for example a S-CSCF, said second network element is for example a SCC AS, said session setup request message is for example an INVITE message conforming with the SIP protocol. More particularly, according to this embodiment, when a local UE or a mobile switch center MSC sends out an INVITE message to the S-CSCF to request for setting up a session with a remote UE, the S-CSCF forwards this INVITE message to a corresponding SCC AS according to the service logic having iFC.

Next, in step 702, said second network element decides if the condition for anchoring a media path in a media anchor point is met, and if yes, then it will instruct said media anchor point to assign respective media endpoint for a local terminal and a remote terminal. Herein, said media anchor point is for example a MRF. However, it should be clear that said media anchor point may also be other entities, such as a MGW or IBGF. More particularly, according to the present embodiment, if the SCC AS decides for example that the local UE supports the SRVCC/ISC natures and the local UE is camping in an access network with high SRVCC handover probability, then it instructs the MRF to assign respective media endpoints for the local and remote UEs by sending an INVITE message to the MRF. However, it should be clear that the present invention is not limited to use the SCC AS, but also can use other entities to perform the above deciding function, such as the S-CSCF or IBCF.

As described above, for deciding the high SRVCC handover probability of access network, the SCC AS may pre-configure a list of P-CSCFs corresponding to the access network having high SRVCC handover probability, and the operator may set the threshold of the high SRVCC handover probability and predefine a network having high handover probability.

Then, in step 703, said media anchor point assigns respective media endpoints for the local terminal and remote terminal, connects the media endpoints together and sends to said second network element a first response message with the session description protocol information of said media endpoints. Herein, said first response message is for example a 200 OK message conforming with the SIP protocol. More particularly, in the present embodiment, the MRF assigns a media endpoint 1 for the local UE and a media endpoint 2 for the remote UE, connects the media endpoints 1 and 2 together and sends to the SCC AS an 200 OK with the SDP information of the media endpoints 1 and 2.

Next, in step 704, said second network element terminates a sub-session with said local terminal according to said session description protocol information and initiates creation of a sub-session with said remote terminal. More particularly, in the present embodiment, the SCC AS terminates the sub-session with the local UE according to the SDP information of the media endpoint 1, and initiates creation of a sub-session with the remote UE according to the SDP information of the media endpoint 2.

Next, in step 705, after said remote terminal having acknowledged, said second network element sends to said local terminal a second response message with session description protocol information of the media endpoint of the local terminal via said first network element. Herein, said second response message is for example a 200 OK message conforming with the SIP protocol. More particularly, in the present embodiment, after the remote UE having sent a 200 OK to the SCC AS for acknowledgement, the SCC AS sends to the S-CSCF a 200 OK with the SDP information of the media endpoint 1 of the local UE, and then the S-CSCF forwards this 200 OK to the local UE.

Next, in steps 706 and 707, said local terminal acknowledges said second network element in an access leg sub-session, and then said second network element acknowledges said remote terminal in a remote leg sub-session. More particularly, after said local UE having received a 200 OK message with the SDP information of the media endpoint 1 from the S-CSCF, the local UE sends to the SCC AS a 200 OK message for acknowledgement in an access leg sub-session, and the SCC AS sends to the remote UE a 200 OK message for acknowledgement in an remote leg sub-session.

Then, in step 708, said second network element sends to said media anchor point a first message with the session description protocol information of the target transfer-in access leg upon reception of a handover request message. Herein, said first message is for example a re-INVITE message conforming with the SIP protocol. More particularly, in the present embodiment, when the UE or MSC sends to the SCC AS an INVITE message to request an ISO session transfer, the SCC AS sends to the MRF a re-INVITE message with the SDP information of the target transfer-in access leg.

Next, in step 709, said media anchor point replaces a source transfer-out access leg by said target transfer-in access leg, and acknowledges said second network element. More particularly, in the present embodiment, the MRF replaces the source transfer-out access leg by the target transfer-in access leg according to the SDP information in the re-INVITE message, and sends a 200 OK to the SCC AS for acknowledgement. Thereby, the SCC AS may release the source access leg of said session.

It should be noted that, although the present embodiment only describes the case that the local UE initiates a call, it is also applicable to the case that the local UE is a callee, in which case the remote UE can be considered as "a local UE".

It can be therefore seen from the above description, the signaling delay of the ISO session transfer procedure may be greatly shortened by using the method for shortening signaling delay of the ISC session transfer of the present embodiment, in particular when the SCC AS terminates the SIP signaling of two sub-sessions, the delay of the remote leg update sub-procedure may be shortened to zero. Furthermore, the implementation of the method of the present embodiment does not need to introduce a new network function entity, but only needs to modify slightly the existing function entities, which thus provides an advantage of simple implementation.

Based on the same inventive concept, according to another aspect of the present invention, a network element for controlling the IMS service continuity ISC session transfer is proposed. This network element will be described below with referent to the figure.

Figure 8:
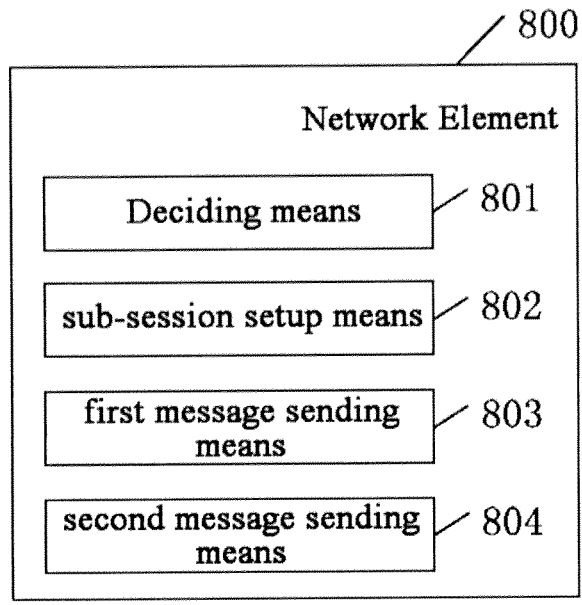
FIG. 8 is a block diagram of a network element for controlling ISC session transfer according to an embodiment of the present invention.

FIG. 8 shows a network element 800 according to an embodiment of the present invention. The network element 800 comprises a deciding means 801, a sub-session setup means 802, a first message sending means 803 and a second message sending means 804. The deciding means 801 is used for deciding if the condition for anchoring a media path in a media anchor point is met upon reception of a session setup request message, and if yes, then it instructs said media anchor point to assign respective media endpoints for a local terminal and a remote terminal. For example, upon reception of an INVITE message from a MSC or a local UE, if the deciding means 801 decides that the local UE supports the SRVCC/ISC natures and the local UE is camping in an access network with high SRVCC handover probability, then it instructs the MRF to assign respective media endpoints for the local and remote UES by sending an INVITE message to the MRF. The sub-session setup means 802 is used for, upon reception of a first response message with the session description protocol information of said media endpoints from said media anchor point, terminating a sub-session with said local terminal according to said session description protocol information and initiating creation of a sub-session with said remote terminal. For example, when the MRF sends to the SCC AS a 200 OK with the SDPs of media endpoints 1 and 2, the sub-session setup means 802 terminates a sub-session with the local UE according to said SDPs and initiates creation of a sub-session with said remote UE. The first message sending means 803 is used for, after said remote terminal having acknowledged, sending to said local terminal a second response message with the session description protocol information of the media endpoint of said local terminal. For example, after the remote UE having returned a 200 OK message, the first message sending means 803 sends to the local UE a 200 OK message with SDP of media endpoint 1 of the local UE. The second message sending means 804 is used for, upon reception of a handover request message, sending to said media anchor point a first message with the session description protocol information of a target transfer-in access leg. For example, when the MSC or local UE sends an INVITE message to the SCC AS to request for an ISC session transfer, the second message sending means 804 sends to the MRF a re-INVITE message with SDP of the target transfer-in access leg.

In implementation, the network element 800 of the present embodiment as well as the deciding means 801, the sub-session setup means 802, the first message sending means 803 and the second message sending means 804 it includes, may be implemented in software, hardware or a combination of them. For example, those skilled in the art are familiar with a variety of devices which may be used to implement these components, such as micro-processor, micro-controller, ASIC. PLD and/or FPGA etc. The respective components of the network element of the present embodiment may also be implemented separately physically but interconnected operatively.

In operation, said network element for controlling IMS service continuity ISC session transfer of the embodiment illustrated with reference to FIG. 8, may implement the above described method for shortening signaling delay of the IMS service continuity ISC session transfer procedure. By using said network element 800, the signaling delay of the ISC session transfer procedure may be greatly shortened, in particular when the SCC AS terminates the SIP signaling of two sub-sessions, the delay of the remote leg update sub-procedure may be shortened to zero. Furthermore, the implementation of the network element 800 of the present embodiment does not need to introduce a new network function entity, but only needs to modify slightly the existing function entities, which thus provides an advantage of simple implementation.

Based on the same inventive concept, according to yet another aspect of the present invention, a network element for anchoring a media path in the IMS service continuity ISC session transfer is proposed. This network element will be described below with referent to the figure.

Figure 9:
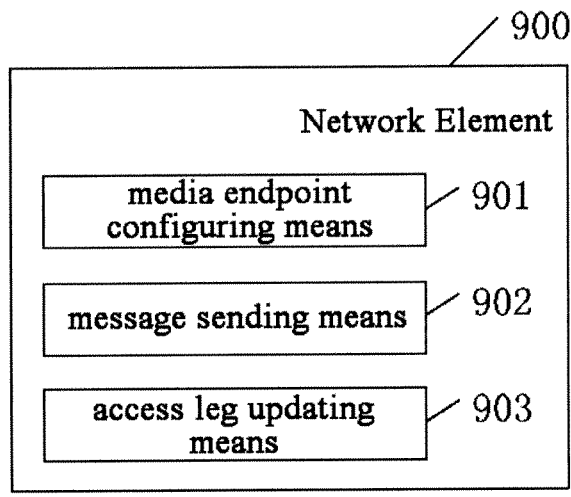
FIG. 9 is a block diagram of a network element for anchoring media path in ISC session transfer procedure according to an embodiment of the present invention.

FIG. 9 shows a network element 900 according an embodiment of the present invention. The network element 900 comprises a media endpoint configuration means 901, a message sending means 902 and an access leg updating means 903. The media endpoint configuration means 901 is used for assigning respective media endpoints for a local terminal and a remote terminal upon reception of an instruction from another network element, and connects said media endpoints together. For example, upon reception of an INVITE message from the SCC AS, the media endpoint configuration means 901 assigns a media endpoint 1 for the local UE and a media endpoint 2 for the remote UE, and connects the media endpoints 1 and 2 together. The message sending means 902 is used for sending a response message (200 OK) with the session description protocol information of said media endpoints to said another network element. For example, the message sending means 902 sends a 200 OK message with the SDP information of the media endpoints 1 and 2 to the SCC AS. The access leg updating means 903 is used for replacing a source transfer-out access leg by a target transfer-in access leg.

In implementation, the network element 900 of the present embodiment as well as the media endpoint configuration means 901, the message sending means 902 and the access leg updating means 903 it includes, may be implemented in software, hardware or a combination of them. For example, those skilled in the art are familiar with a variety of devices which may be used to implement these components, such as micro-processor, micro-controller, ASIC. PLD and/or FPGA etc. The respective components of the network element of the present embodiment may also be implemented separately physically but interconnected operatively.

In operation, said network element for anchoring a media path in the IMS service continuity ISO session transfer of the embodiment illustrated with reference to FIG. 9, may implement the above described method for shortening signaling delay of the IMS service continuity ISO session transfer procedure. By using said network element 900, the signaling delay of the ISO session transfer procedure may be greatly shortened, in particular when the SCC AS terminates the SIP signaling of two sub-sessions, the delay of the remote leg update sub-procedure may be shortened to zero. Furthermore, the implementation of the network element 900 of the present embodiment does not need to introduce a new network function entity, but only needs to modify slightly the existing function entities, which thus provides an advantage of simple implementation.

Based on the same inventive concept, according to yet another aspect of the present invention, a communication system is proposed, comprising at least two terminals, a network element for controlling IMS service continuity ISO session transfer and a network element for anchoring a media path in the IMS service continuity ISC session transfer, as described in the above embodiments. In addition, said communication system may also comprise other network elements, such as a P-CSCF, an IBCF etc.

For example, in the communication system of the present embodiment, by dividing the session between the local UE and the remote UE into two independent sub-sessions, the signaling delay of the ISC session transfer procedure may be greatly shortened. The particular operation flow may refer to the above description about the method for shortening signaling delay of the ISC session transfer procedure according to the embodiment of the present invention, and will not be repeated herein.

Although the exemplary embodiments of the method for shortening signaling delay of the IMS service continuity ISO session transfer procedure, the network element for controlling IMS service continuity ISO session transfer, the network element for anchoring a media path in the IMS service continuity ISO session transfer and the communication system including at least two terminals, the network element for controlling IMS service continuity ISC session transfer and the network element for anchoring a media path in the IMS service continuity ISC session transfer are described above in detail, the above embodiments are not exhaustive, and those skilled in the art can make numerous changes and modifications within the spirit and scope of the present invention. Therefore, the present invention is not limited to those embodiments, the scope of which is defined only by the appended claims.

The invention claimed is:

1. A method for shortening signaling delay of IMS service continuity ISC session transfer procedure, comprising:
   receiving, by a first network element, a session setup request message and forwarding said session setup request message to a second network element according to initial filtering criteria iFC,
   deciding, by said second network element, if the condition for anchoring a media path in a media anchor point is met, and if yes, then instructing said media anchor point to assign respective media endpoints for a local terminal and a remote terminal,
   assigning, by said media anchor point, respective media endpoints for said local terminal and remote terminal, connecting said media endpoints together and sending to said second network element a first response message with session description protocol information of said media endpoints,
   terminating, by said second network element, a sub-session with said local terminal according to said session description protocol information, and initiating creation of a sub-session with said remote terminal,
   after said remote terminal having acknowledged, sending, by said second network element, a second response message with session description protocol information of the media endpoint of said local terminal to said local terminal via said first network element, and wherein, when said ISC session transfer is being performed, said method also comprises:

sending, by said second network element, a first message with session description protocol information of a target transfer-in access leg to said media anchor point, upon reception of a handover request message, replacing, by said media anchor point, a source transfer-out access leg by said target transfer-in access leg, and acknowledging said second network element.

2. The method according to claim 1, comprising also: after said second network element having sent said second response message to said local terminal, said local terminal acknowledging said second network element in an access leg sub-session, and then said second network element acknowledging said remote terminal in a remote leg sub-session.

3. The method according to claim 1, wherein the condition to be met for anchoring a media path in said media anchor point comprises that said local terminal supports Single Radio Voice Call Continuity SRVCC/SIC, and said local terminal is camping in an access network with high SRVCC handover probability.

4. The method according to claim 3, wherein said high SRVCC handover probability occurs in such a case as: the Long Term Evolution LTE and IMS network being deployed with a small LTE coverage, and thus the LTE and IMS network being predefined with high SRVCC handover probability.

5. The method according to claim 1, wherein said second network element instructing said media anchor point to assign media endpoints is performed by one of the following means:

sending to said media anchor point a second message for instructing said media anchor point to assign respective media endpoints for said local terminal and remote terminal; or respectively sending to said media anchor point a third message for instructing said media anchor point to assign a media endpoint for said local terminal and a fourth message for instructing said media anchor point to assign a media endpoint for said remote terminal.

6. The method according to claim 1, wherein said first network element is a Service Call Session Control Function entity, said second network element is a Service Continuity Control Application Server, and said media anchor point is a Media Resource Function entity; and/or said session setup request message, said handover request message and said second message, third message and fourth message are INVITE messages, said first message is a re-INVITE message, said first response message and said second response message are 200 OK message.

7. An apparatus for controlling IMS service continuity ISC session transfer, said apparatus comprising:

a network element configured to:

decide if a condition for anchoring a media path in a media anchor point is met upon reception of a session setup request message, and if yes, then instruct said media anchor point to assign respective media endpoints for a local terminal and a remote terminal;

upon reception of a first response message with session description protocol information of said media endpoints from said media anchor point, terminate a sub-session with said local terminal according to said session description protocol information and initiate creation of a sub-session with said remote terminal;

after said remote terminal having acknowledged, send to said local terminal a second response message with session description protocol information of the media endpoint of said local terminal; and upon reception of a transfer request message, send to said media anchor point a first message with session description protocol information of a target transfer-in access leg.

8. The apparatus according to claim 7, wherein the condition to be met for anchoring a media path in said media anchor point comprises that said local terminal supports Single Radio Voice Call Continuity SRVCC/SIC, and said local terminal is camping in an access network with high SRVCC handover probability.

9. The apparatus according to claim 8, wherein said high SRVCC handover probability occurs in such a case as: the Long Term Evolution LTE and IMS network being deployed with a small LTE coverage, and thus the LTE and IMS network being predefined with high SRVCC handover probability.

10. The apparatus according to claim 7, wherein said network element instructing said media anchor point to assign media endpoints is performed by one of the following:

sending to said media anchor point a second message for instructing said media anchor point to assign respective media endpoints for said local terminal and remote terminal; or respectively sending to said media anchor point a third message for instructing said media anchor point to assign a media endpoint for said local terminal and a fourth message for instructing said media anchor point to assign a media endpoint for said remote terminal.

11. The apparatus according to claim 7, wherein:

said network element is a Service Continuity Control Application Server, and said media anchor point is a Media Resource Function entity and/or said session setup request message, said handover request message and said second message, third message and fourth message are INVITE messages, said first message is a re-INVITE message, said first response message and said second response message are 200 OK messages.

12. A network element for anchoring a media path in IMS service continuity ISC session transfer, said network element being configured to:

upon reception of an instruction from another network element, assign respective media endpoints for a local terminal and a remote terminal and connect said media endpoints together;

send to said another network element a response message with session description protocol information of said media endpoints (200 OK); and replace a source transfer-out access leg by a target transfer-in access leg.

13. The network element according to claim 12, wherein said network element is a Media Resource Function entity, and said another network element is a Service Continuity Control Application Server.

14. The network element according to claim 12, wherein said response message is a 200 OK message.

15. A communication system, comprising:

at least two terminals;

a first network element configured to:

decide if a condition for anchoring a media path in a media anchor point is met upon reception of a session setup request message, and if yes, then instruct said media anchor point to assign respective media endpoints for a local terminal and a remote terminal;

upon reception of a first response message with session description protocol information of said media endpoints from said media anchor point, terminate a sub-session with said local terminal according to said session description protocol information and initiate creation of a sub-session with said remote terminal;

after said remote terminal having acknowledged, send to said local terminal a second response message with session description protocol information of the media endpoint of said local terminal; and upon reception of a transfer request message, send to said media anchor point a first message with session description protocol information of a target transfer-in access leg; and a second network element configured to:

upon reception of an instruction from a third network element, assign respective media endpoints for a local terminal and a remote terminal and connect said media endpoints together, send to said third network element a response message with session description protocol information of said media endpoints, and replace a source transfer-out access leg by a target transfer-in access leg.

\* \* \* \* \*